US006868177B1

(12) United States Patent
Camahort et al.

(10) Patent No.: US 6,868,177 B1
(45) Date of Patent: Mar. 15, 2005

(54) EFFICIENT BLOCK TRANSFORM INCLUDING PRE-PROCESSING AND POST PROCESSING FOR AUTOSTEREOSCOPIC DISPLAYS

(75) Inventors: Emilio Camahort, Valencia (ES); Mark E. Holzbach, Austin, TX (US); Robert L. Sitton, Austin, TX (US)

(73) Assignee: Zebra Imaging, Inc., Pflugerville, TX (US)

( * ) Notice: Subject to any disclaimer, the term of this patent is extended or adjusted under 35 U.S.C. 154(b) by 686 days.

(21) Appl. No.: 10/036,814

(22) Filed: Oct. 19, 2001

Related U.S. Application Data

(63) Continuation-in-part of application No. 09/760,097, filed on Jan. 11, 2001, now Pat. No. 6,549,308.
(60) Provisional application No. 60/175,475, filed on Jan. 11, 2000.

(51) Int. Cl.[7] .................................................. G06K 9/00
(52) U.S. Cl. ....................... 382/154; 382/205; 382/305; 359/93; 345/418; 348/40; 711/1
(58) Field of Search ............................... 382/154, 294, 382/300, 205, 305; 345/418, 426, 427; 348/400, 42, 51; 359/8–10, 22–29, 32, 426, 427; 714/6; 711/1, 2, 112, 114

(56) References Cited

U.S. PATENT DOCUMENTS

| 4,206,965 A |   | 6/1980  | McGrew ................. 350/3.76     |
|-------------|---|---------|--------------------------------------|
| 4,834,476 A |   | 5/1989  | Benton .................... 350/3.76 |
| 5,003,497 A |   | 3/1991  | Priem ...................... 364/522 |
| 5,194,971 A |   | 3/1993  | Haines ........................ 359/9 |
| 5,237,433 A |   | 8/1993  | Haines et al. ................ 359/9  |
| 5,479,525 A | * | 12/1995 | Nakamura et al. ........ 382/297      |
| 5,587,742 A | * | 12/1996 | Hau et al. .................. 348/441 |
| 5,852,504 A |   | 12/1998 | Kato et al. ................... 359/9 |
| 6,009,188 A |   | 12/1999 | Cohen et al. .............. 382/154   |
| 6,397,292 B1| * | 5/2002  | Venkatesh et al. ......... 711/114    |

OTHER PUBLICATIONS

Marc Levoy and Pat Hanrahin, "Light Field Rendering," in *Proceedings of SIGGRAPH '96*, (New Orleans, LA), Aug. 4–9, 1996., pp. 31–42.

William W. Halle and Adam B. Kropp, "Fast Computer Graphics Rendering For Full Parallax Spatial Displays," *Practical Holography XI*, Proc. SPIE, vol. 3011, Feb. 10–11, 1997, pp. 105–112.

Michael Halle, "Multiple Viewpoint Rendering," in *Proceedings of SIGGRAPH '98*, (Orlando, FL), Jul. 19–24, 1996., pp. 243–254.

Emilio Camahort and Donald Fussell, "A Geometric Study of Light Field Representations," Dept. of Computer Science, The University of Texas at Austin, Jan. 7, 2001, pp. 1–17.

Aaron Isaksen, Leonard McMillan and Steven J. Gortler, "Dynamically Reparameterized Light Fields," *Proceedings of ACM SIGGRAPH 2000, Computer Graphics Proceedings, Annual Conference Series*, Jul. 2000, pp. 297–306.

(List continued on next page.)

*Primary Examiner*—Bhavesh M. Mehta
*Assistant Examiner*—Sheela Chawan
(74) *Attorney, Agent, or Firm*—Campbell Stephenson Ascolese LLP; Marc R. Ascolese

(57) ABSTRACT

Image data processing techniques utilizing multiple processes operating on one or more processors of one or more computer systems can be used to efficiently rearrange or reparameterizing image data to form hologram element (hogel) images which can then be used to produce holographic stereograms. These techniques utilize matrix manipulation of portions of image data both within a single process, and across multiple processes typically executing on different processors, and each utilizing a subset of the overall set of image data.

63 Claims, 9 Drawing Sheets

OTHER PUBLICATIONS

Steven J. Gortler, Radek Grzeszczuk, Richard Szeliski, Michael F. Cohen, "The Lumigraph," *Proceedings of the 23rd Annual Conference on Computer Graphis*, New Orleans, LA, ACM Press, 1996, pp. 43–54.

Mark Holzbach, "Three–Dimensional Image Processing for Synthetic Holographic Stereograms," submitted to the Department of Architecture at the Massachusetts Institute of Technology, Sep. 1986, pp. 1–55.

* cited by examiner

EFFICIENT BLOCK TRANSFORM INCLUDING PRE-PROCESSING AND POST PROCESSING FOR AUTOSTEREOSCOPIC DISPLAYS

This application is a continuation-in-part of, and claims the benefit of priority based on, U.S. patent application Ser. No. 09/760,097, entitled "Unbiased Light Field Models For Rendering And Holography," filed Jan. 11, 2001 now U.S. Pat. No. 6,549,308, and naming Emilio Camahort as the inventor, which in turn claims the benefit, under 35 U.S.C § 119 (e), of U.S. Provisional Application No. 60/175,475, entitled "Unbiased Light Field Models For Rendering And Holography," filed on Jan. 11, 2000 and naming Emilio Camahort as the inventor. The above-referenced applications are hereby incorporated by reference herein in their entirety.

FIELD OF THE INVENTION

The present invention relates in general to the field of hologram production and, more particularly, processing image data for use in the production of holographic stereograms.

BACKGROUND OF THE INVENTION

One-step hologram (including holographic stereogram) production technology has been used to satisfactorily record holograms in holographic recording materials without the traditional step of creating preliminary holograms. Both computer image holograms and non-computer image holograms may be produced by such one-step technology. In some one-step systems, computer processed images of objects or computer models of objects allow the respective system to build a hologram from a number of contiguous, small, elemental pieces known as hologram elements or hogels. To record each hogel on holographic recording material, an object beam is conditioned through the rendered image and interfered with by a reference beam. A number of hogels recorded together on the same piece of holographic recording material is often referred to as a tile. Examples of techniques for one-step hologram production can be found in the U.S. Patent Application entitled "Method and Apparatus for Recording One-Step, Full-Color, Full-Parallax, Holographic Stereograms," Ser. No. 09/098,581, naming Michael A. Klug, Mark E. Holzbach, and Alejandro J. Ferdman as inventors, and filed on Jun. 17, 1998, which is hereby incorporated by reference herein in its entirety. Two-step holograms are created using indirect or transfer methods, that require recording a transfer hologram before printing the master hologram.

FIG. 1 illustrates the relationship between a hogel 120 and the computer graphics image 130 used to create the hogel (this relationship is similar to the relationship among hologram printer components such as a spatial light modulator and holographic recording material, as discussed below). The computer graphics image 130 is made up of a number of pixels 140 each of which can have data values depending on, for example, color and intensity. Each of the pixels 140 can define a directional image sample through the hologram. As illustrated by arrows 150 and 160, the relative position of each pixel 140 with respect to hogel 120 can be used to define directions in which a three-dimensional (3D) computer graphics scene can be viewed and/or rendered.

Similarly, two elements of a hologram production system 100 are shown in FIG. 1. Spatial light modulator (SLM) 130 includes a number of pixels 140 upon which a computer graphics image can be displayed. An object beam (not shown) passes through spatial light modulator 130, which modifies the intensity of the object beam according to values of the various pixels 140. This object beam typically passes through optics (not shown) so that when the object beam reaches tile 110, it can be used in conjunction with a reference beam to form an interference pattern which is recorded as hogel 120.

Distortion associated with the generation of hogels for horizontal-parallax-only (HPO) holographic stereograms is analyzed Michael W. Halle in *The Generalized Holographic Stereogram*, Master's Thesis, Massachusetts Institute of Technology, February 1991, which is hereby incorporated by reference herein in its entirety. In general for HPO holographic stereograms, the best viewer location where a viewer of a holographic stereogram can see an undistorted image is at the plane where the camera (or the camera model in the case of computer graphics images) captured the scene. This is an undesirable constraint on the viewability of holographic stereograms. Using several different techniques, one can compensate for the distortion introduced when the viewer is not at the same depth with respect to the hologram as the camera.

An anamorphic physical camera can be created with a standard spherical-surfaced lens coupled with a cylindrical lens, or alternately two crossed cylindrical lenses can be used. Using these optics, one can independently adjust horizontal and vertical detail in the stereogram images, thereby avoiding distortion. Such physical systems are typically large, expensive devices that can require constant readjustment throughout the hologram production process. For these and other reasons, anamorphic optics are typically used to correct for distortion in holographic stereogram production.

For a computer graphics camera, horizontal and vertical independence means that perspective calculations can be altered in one direction without affecting the other. Moreover, since the source of the images used for producing a holographic stereogram are typically rendered computer graphics images (or digital photographs), correcting the distortion as part of the image generation process is a common technique.

For example, if the computer graphics images being rendered can be rendered as if seen through the aforementioned physical optics (e.g., using ray tracing where the computer graphics model includes the optics between the scene and the computer graphics camera), then hogel images that account for distortion can be directly rendered. However, such an application of ray tracing is currently impractical given the speed of software ray-tracers, the expense of hardware ray-tracers, and the size of the data sets typically involved in holographic stereogram production.

Another technique for rendering hogel images that are "pre-distorted" is described in M. Halle and A Kropp, "Fast Computer Graphics Rendering for Full Parallax Spatial Displays," *Practical Holography XI*, Proc. SPIE, vol. 3011, pages 105–112, Feb. 10–11, 1997, which is hereby incorporated by reference herein in its entirety. While useful for its speed, the techniques of Halle and Kropp often introduce additional (and undesirable) rendering artifacts and are susceptible to problems associated with anti-aliasing. Improvements upon the techniques of Halle and Kropp are discussed in the U.S. Patent entitled "Rendering Methods For Full Parallax Autosteroscopic Displays," Ser. No. 09/474,361, naming Mark E. Holzbach and David Chen as inventors, and filed on Dec. 29, 1999, which is hereby incorporated by reference herein in its entirety.

Still another technique for rendering hogel images utilizes a computer graphics camera whose horizontal perspective (in the case of horizontal-parallax-only (HPO) and full parallax holographic stereograms) and vertical perspective (in the case for fill parallax holographic stereograms) are positioned at infinity. Consequently, the images rendered are parallel oblique projections of the computer graphics scene, ie., each image is formed from one set of parallel rays that correspond to one "direction". If such images are rendered for each of (or more than) the directions that a hologram printer is capable of printing, then the complete set of images includes all of the image data necessary to assemble all of the hogels.

This last technique is particularly useful for creating holographic stereograms from images created by a computer graphics rendering system utilizing imaged-based rendering. Image-based rendering systems typically generate different views of an environment from a set of pre-acquired imagery.

The development of image-based rendering techniques generally, and the application of those techniques to the field of holography have inspired the development of light field rendering as described by, for example, M. Levoy and P. Hanrahan in "Light Field Rendering," in *Proceedings of SIGGRAPH'96*, (New Orleans, La., Aug. 4–9, 1996), and in *Computer Graphics Proceedings, Annual Conference Series*, pages 31–42, ACM SIGGRAPH, 1996, which are hereby incorporated by reference herein in their entirety. The light field represents the amount of light passing through all points in 3D space along all possible directions. It can be represented by a high-dimensional function giving radiance as a function of time, wavelength, position and direction. The light field is relevant to image-based models because images are two-dimensions projections of the light field. Images can then be viewed as "slices" cut through the light field. Additionally, one can construct higher-dimensional computer-base models of the light field using images. A given model can also be used to extract and synthesize new images different from those used to build the model.

Formally, the light field represents the radiance flowing through all the points in a scene in all possible directions. For a given wavelength, one can represent a static light field as a five-dimensional (5D) scalar function $L(x, y, z, \theta, \phi)$ that gives radiance as a function of location (x, y, z) in 3D space and the direction $(\theta, \phi)$ the light is traveling. Note that this definition is equivalent to the definition of plenoptic function. Typical discrete (i.e., those implemented in real computer systems) light-field models represent radiance as a red, green and blue triple, and consider static time-independent light-field data only, thus reducing the dimensionality of the light-field function to five dimensions and three color components. Modeling the light-field thus requires processing and storing a 5D function whose support is the set of all rays in 3D Cartesian space. However, light field models in computer graphics usually restrict the support of the light-field function to four dimensional (4D) oriented line space. Two types of 4D light-field representations have been proposed, those based on planar parameterizations and those based on spherical, or isotropic, parameterizations.

As discussed in the aforementioned U.S. patent application Ser. No. 09/760,097, isotropic parameterizations are particularly useful for applications in computer generated holography. Isotropic models, and particularly direction-and-point parameterizations (DPP) introduce less sampling bias than planar parameterizations, thereby leading to a greater uniformity of sample densities. In general, DPP representations are advantageous because they require fewer correction factors than other representations, and thus their parameterization introduces fewer biases in the rendering process.

Returning to FIG. 1 as an example, if each line between the center of each pixel 140 and the center of hogel 120 defines a direction (e.g., directions 150 and 160), then parallel oblique projections can be rendered (using image-based rendering or other technique) for each direction. Each image resulting from the rendering represents a single direction, and includes a data value (e.g. a pixel intensity) for each hogel in tile 110. Consequently, the information needed to record any one hogel is distributed across a number of images. For example, the first pixel value of the first hogel of the tile is in the first image, the second pixel value for the first hogel is in the second image, the third pixel value for the first hogel is in the third image, and so on. Thus, image data must be rearranged to form hogels. Some techniques for rearranging or reparameterizing such data are described in the aforementioned master's thesis *The Generalized Holographic Stereogram*. However, the techniques described in *The Generalized Holographic Stereogram* concentrate on HPO applications, and do little to address the significant data management problems associated with creating desirable holographic stereograms.

For example, the hologram printers described in the in the aforementioned U.S. patent application Ser. No. 09/098,581, are capable of producing tiles that have 300 by 300 hogels (each hogel being approximately 2 mm by 2 mm). A typical spatial light modulator for such a system is a liquid crystal display (LCD) having a resolution of 1280 by 1024 pixels, where the relationship between each pixel and the hogel defines a rendering direction. If each pixel of each image is rendered in 24 bit color (3 bytes per pixel), then 300×300× 1280×1024×3=342,835,200,000 bytes (approximately 335 GB) of data is required. With that much data, it is difficult to efficiently rearrange the image data to produce hogel images, given computer system memory capacity, storage capacity, storage latency, storage access transfer speeds, network bandwidth and latency, and processor constraints.

Accordingly, it is desirable to have efficient image data processing techniques for use in preparing hogel images for use in the production of holographic stereograms.

SUMMARY OF THE INVENTION

It has been discovered that novel image data processing techniques utilizing multiple processes operating on one or more processors of one or more computer systems can be used to efficiently rearrange or reparameterizing image data to form hogel images which can then be used to produce holographic stereograms. These techniques utilize matrix manipulation of portions of image data both within a single process, and across multiple processes typically executing on different processors, and each utilizing a subset of the overall set of image data.

Accordingly, one aspect of the present invention provides a computer-implemented method of processing image data for use in holographic stereograms. A plurality of image data sets is provided. At least one of the plurality of image data sets is loaded into a memory, wherein the at least one of the plurality of image data sets is organized as an image block matrix. The image block matrix is transposed to form a transposed imaged block matrix. A portion of the transposed image block matrix is replaced with a portion of a second transposed image block matrix to form a resulting image block matrix. The resulting image block matrix is transposed to form hologram element (hogel) portion matrix.

In another aspect of the present invention, an apparatus includes a processor, a storage medium coupled to the processor and including a plurality of image data sets, a memory coupled to the processor, and a computer program for processing image data for use in holographic stereograms. The program is at least partially storable in the memory and executable on the processor. The program includes an image data loading routine, a first transposing routine, a data replacement routine, and a second plurality of image data sets into the memory, wherein the at least one of the plurality of image data sets is organized as an image block matrix. The first posing routine is for transposing the image block matrix to form a transposed imaged block matrix. The data replacement routine is for replacing a portion of the transposed image block matrix with a portion of a second transposed image block matrix to form a resulting image block matrix. The second transposing routine is for transposing the resulting image block matrix to form a hologram element (hogel) portion matrix.

Still another aspect of the present invention provides a computer-implemented method of processing image data for use in holographic stereograms. A plurality of image data sets is provided. At least a portion of one of the plurality of image data sets is loaded in to a memory, the at least a portion of one of the plurality of image data sets including a plurality of pixel values. A first one of the plurality of pixel values is copied from the at least a portion of one of the plurality of image data sets to a first hogel portion in a hogel buffer in the memory. A second one of the plurality of pixel values is copied from the at least a portion of one of the plurality of image data sets to a second hogel portion in the hogel buffer in the memory.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

The following sets forth a detailed description of at least the best contemplated mode for carrying out the one or more devices and/or processes described herein. The description is intended to be illustrative and should not be taken to be limiting.

Figure 2:
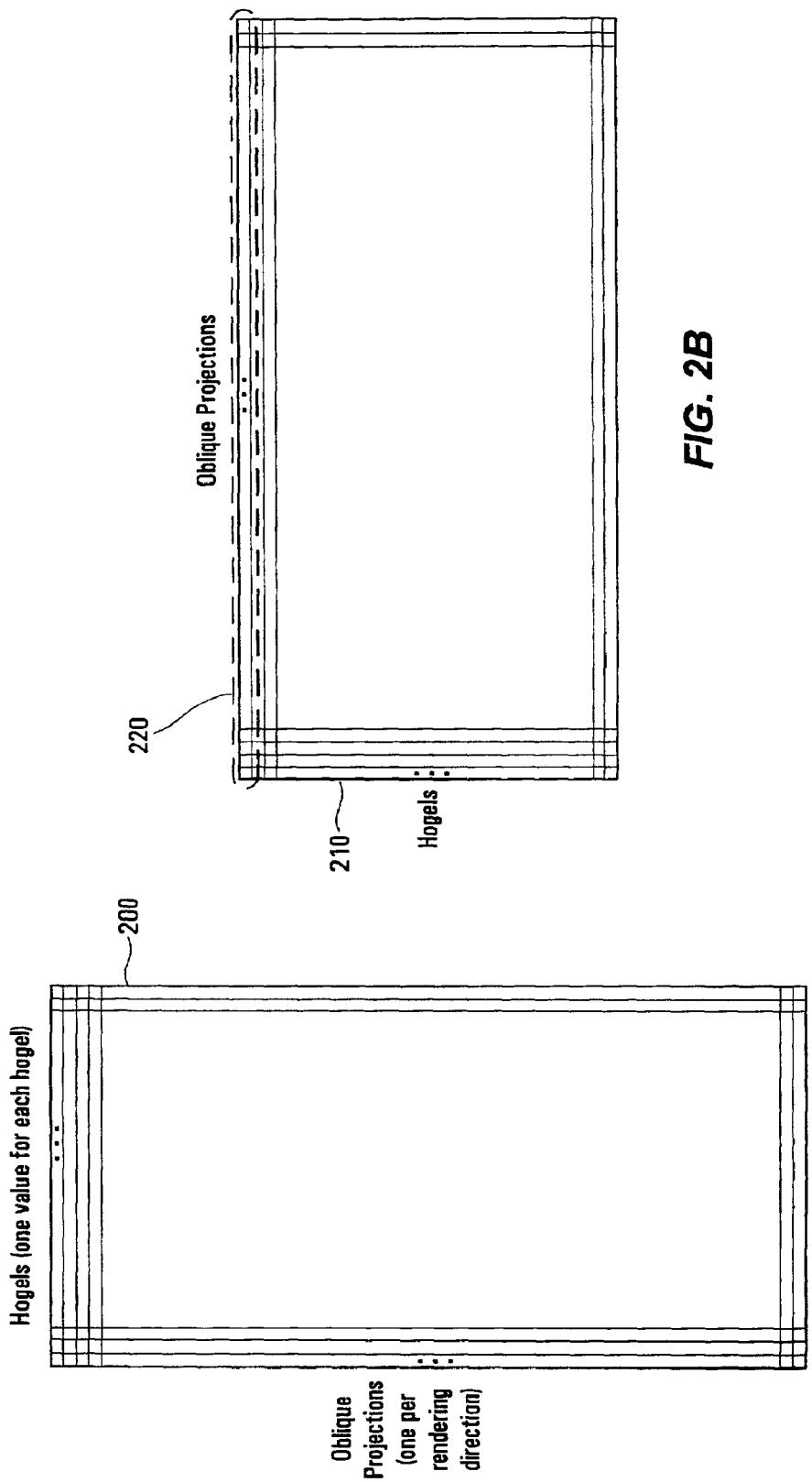
FIGS. 2A–2B illustrate a reparameterization technique for use in producing holographic stereograms.

FIG. 2A illustrates one approach to the reparameterization of image data in order to produce hogel images that can then be used in the production of holographic stereograms. Image matrix 200 is a matrix including all of the image data rendered for a particular holographic stereogram tile. Each row in image matrix 200 has data values corresponding to the number of hogels in the tile, for example 90,000 values for a 300 by 300 hogel tile. Each of these values is typically a 24 bit value representing the color of the corresponding pixel as rendered. The number of rows is equal to the number of parallel oblique projections that were rendered, for example 1,269,760 rows assuming that each pixel of a 1240 by 1024 LCD defines a unique direction for the purposes of rendering.

It should be noted that for the purposes of selecting directions for rendering parallel oblique projections, one need not be strictly limited to the directions defined by the SLM used in the hologram printer. For example, one could render images corresponding to more than the number of directions the hologram printer is capable of printing, effective over-sampling so that additional image processing techniques can be used. Similarly, one can render images corresponding to a number of directions smaller than the number of directions the hologram printer is capable of printing. For example, instead of defining one direction based on the line connecting the center of one LCD pixel with the center of the hogel, a direction defined by the line between the center of a set of four adjacent pixels and the center of the hogel can be used. Given that such an approach would reduce the amount of data (and hence processing time for both rendering and reparameterization) required, it is particularly desirable for shallow image holographic stereograms or holographic stereograms with reduced resolution.

Still another variation of direction selection for rendering parallel oblique projections is to include consideration for distortion that will occur in the hologram production system. In choosing directions based solely on the position of the SLM with respect to the hologram plane, a pin hole camera model is typically assumed. If instead, consideration is given to the optical elements that will be placed between the SLM and the hologram plane in the hologram production system, then the directions chosen for rendering might include pre-distortion to correct for the distortive effects of the interim optical elements. This operation can be achieved, for example, using a look-up table with entries corresponding to each SLM pixel, or by performing corrective calculations on-the-fly.

Given that image matrix 200 contains all of the image data, all of the data for each hogel can be extracted by reading down each column (i.e., one pixel value from each parallel oblique projection or direction). In many cases, reading matrix data in column form is an inefficient operation in computer systems, it being more efficient to read data out a row at time. To that end, FIG. 2B illustrates the transpose image matrix 210 which is the transpose of image matrix 200. Thus, row 220 represents the complete set of image data needed for the first hogel, the next row represents the complete set of image data needed for the second hogel, and so on. Image matrix 200 and transpose image matrix 210 are illustrated as two-dimensional matrices. However, those having ordinary skill in the art will readily recognize that the data contained in each of the matrices may not be explicitly stored in a computer system's memory in the illustrated format. That is, the data can be stored in a sequential manner, one element after the other. What is important is that the data be indexed or parameterized in two dimensions (in this case by oblique projection number and by hogel number). Thus, while it is useful to view these data sets in two-dimensional form, and to consider the transpose operation as illustrated, the actual implementation can vary from that which is illustrated.

With current computer systems image matrix 200 is typically too large to be manipulated by a single processor using a single memory and storage device. Of course, where the number of hogels and/or the number of parallel oblique projections is reduced, it becomes more likely that a single computer system can handle the task. Similarly, a reduction in the bit depth of the parallel oblique projections (e.g., from 24 bits to some smaller number) can reduce the computer system performance requirements. However, the data from image matrix 200 is typically distributed among several different processors and/or computer systems. This is often true for the image rendering process itself. For example, if there are a total of four computer systems or hosts, one quarter of all of the required parallel oblique projections might be rendered on each host. Which images will be rendered on which host can be judiciously selected so that the image data to be reparameterized is already on the host that will perform the reparameterization.

Figure 3:
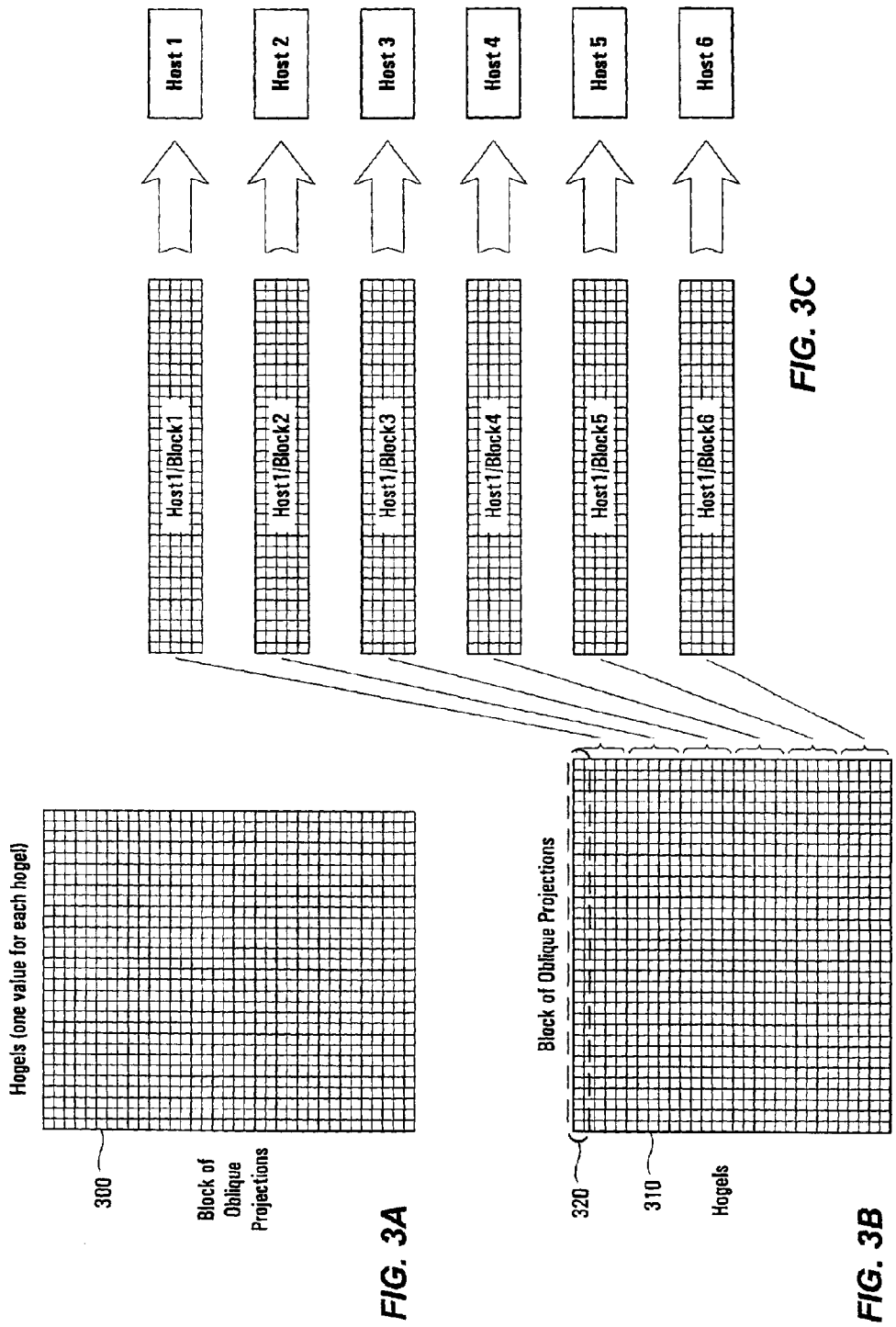
FIGS. 3A–3C illustrate several steps in one of the reparameterization techniques of the present invention.

FIGS. 3A–3C illustrate an example of some of the steps in the reparameterization process. In this example, a block of parallel oblique projections, image block matrix 300 is the subject of data processing. Depending on the overall amount of image data, the block of data may correspond to the entire amount of rendered image data assigned to the particular host, or it may be a further subset of that data. For example, the amount of addressable random access memory associated with a processor is usually orders of magnitude less than the amount of non-volatile storage (e.g., hard disk space). As shown, image block matrix 300 is taken from a data set for a total of 30 hogels. Additionally, data from only 35 parallel oblique projections belongs to the block. Once image block matrix 300 is loaded into memory, it is transposed to form transposed image block matrix 310, as shown in FIG. 3B. In this transposed form, row 320 represents the first 35 directional pixel values for the first hogel (assuming the data in image block matrix 300 is selected from the first 35 parallel oblique projection images). FIG. 3C illustrates the next step. In this example it is assumed that there are a total of six hosts processing the image data. The process executing on Host 1 further divides transposed image block matrix 310 into six blocks, and forwards respective blocks to each of the other hosts. In the case of the first host, it need not do anything to forward the data in Host1/Block1 to itself. Each block has data for different hogels.

Figure 4:
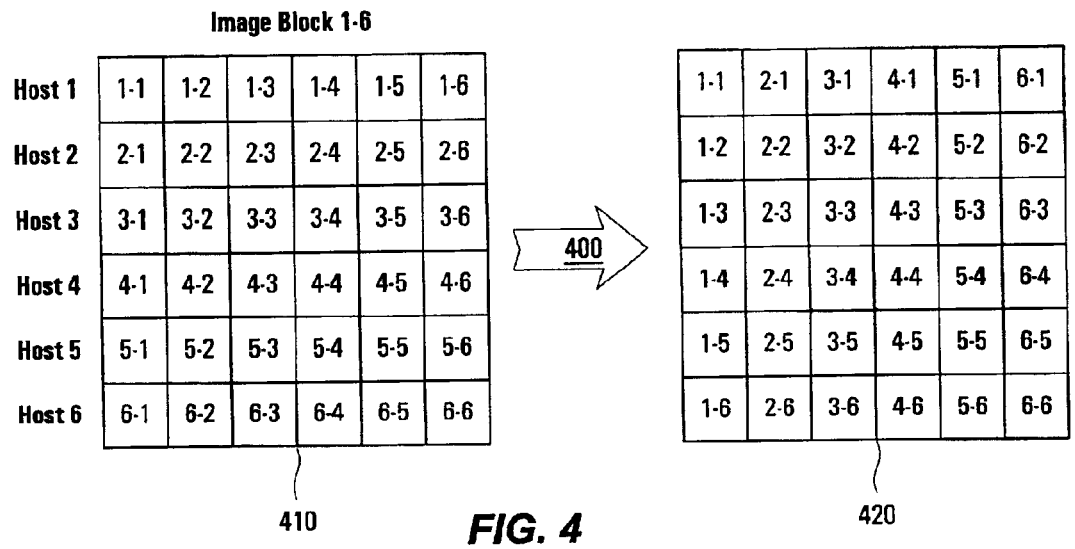
FIG. 4 illustrates multi-process/multi-processor two-dimensional matrix transpose operation.

FIG. 4 illustrates a multi-process/multi-processor two-dimensional matrix transpose operation 400 than can be used to accomplish the data passing shown in FIG. 3C. Each of the six hosts have a sixth of the total image data, so for example Host 1 has the first one sixth of all parallel oblique projection images, Host 2 has the second sixth, and so on. Each host operates on that block of data, or as described in the context of FIG. 3A above a further subset of that data. In FIG. 4, matrix 410 represents the state of data on each of the hosts before the transpose. The first number in each element corresponds to the host number, and the second number corresponds to the block number. Thus, each of the elements in the first row of matrix 410 corresponds to the blocks shown in FIG. 3C. As illustrated by matrix 420, multi-process/multi-processor two-dimensional matrix transpose operation 400 causes each of the Host 1 blocks of matrix 410 to be transferred to the appropriate host block of matrix 420.

Since each host has a sixth of the total amount of image data, each host will ultimately contain one sixth of all the hogels. So, for example, Host 1 will ultimately have all of the data required for Hogels 1–5, Host 2 will ultimately have all of the data for Hogels 610, and so on. In this manner, latencies associated with accesses to the storage media can be reduced.

Figure 5A:
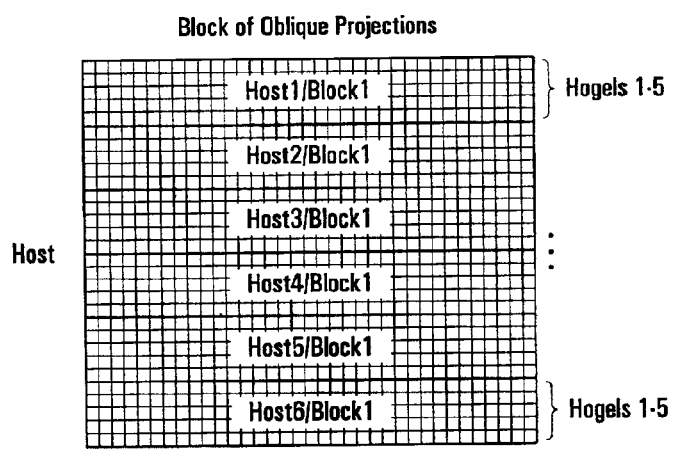
FIGS. 5A–5C illustrate several steps in one of the reparameterization techniques of the present invention.

At the conclusion of the multi-process/multi-processor two-dimensional matrix transpose operation 400, the data in Host 1's memory is as shown in FIG. 5A. Host 1 receives blocks of data corresponding to Hogels 1–5 (although each block represents different parallel oblique projection images, or portions thereof) from each of the other hosts, thereby forming the resulting image block matrix. Similarly, each of the other hosts receives data as suggested by matrix 420 in FIG. 4.

Operations like multi-process/multi-processor two-dimensional matrix transpose operation 400 are common in parallel computing where processes executing on individual cores in a multi-core processor, on individual processors of the same computer system, or on individual processors of different computer systems communicate with each other. Multi-process/multi-processor two-dimensional matrix transpose operation 400 is exemplified by the AllToAll, AllToAll, and AllToAllW operations as defined by the Message Passing Interface 2 (MPI-2) standard, which is hereby incorporated by reference herein in its entirety. Those having ordinary skill in the art will readily recognize that similar operations exist in or can be implemented using other parallel computing schemes such as the Parallel Virtual Machine (PVM) system. Moreover, although FIG. 4 illustrates the message passing among hosts, the host can instead be individual processors within a single computer system, individual processes executing in a single processor (particularly multi-core processors), or some combination.

Figure 5B:
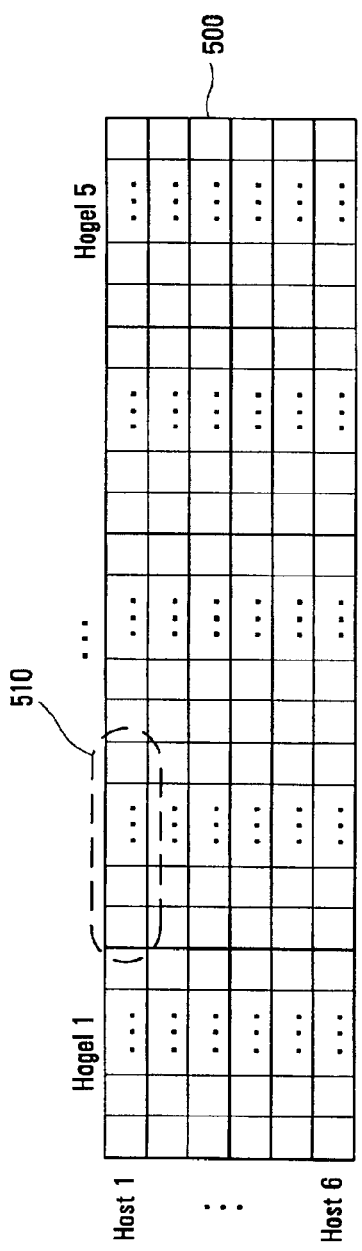
Figure 5C:
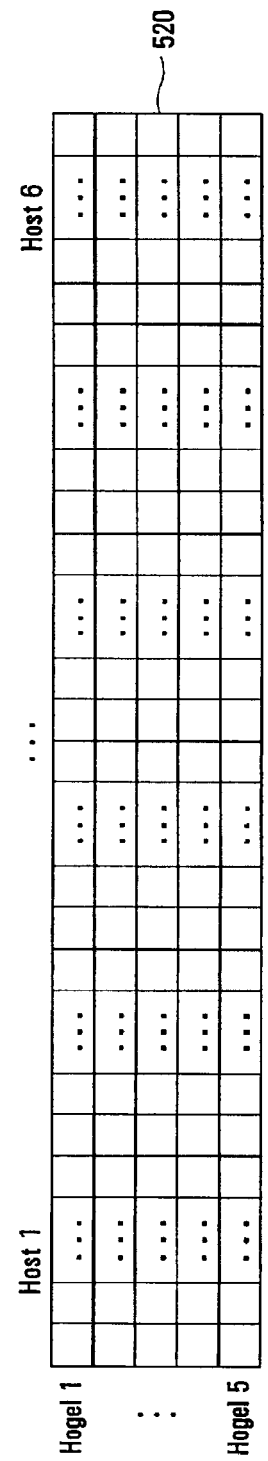

FIG. 5B illustrates the resulting image block matrix in a form slightly different from that in FIG. 5A. In FIG. 5B, each element 510 of the matrix 500 is no longer and individual pixel value, but is instead a set (albeit an incomplete set) of pixel values corresponding to one hogel. Thus, element 510 includes the first 35 hogel pixel values for Hogel 2. FIG. 5B illustrates the principle discussed above, that an important aspect of executing a transpose operation (and describing multidimensional data sets generally) is the way in which data is indexed. FIG. 5C shows the hogel portion matrix 520 that results from transposing matrix 500. With this matrix, data for a hogel can simply be read out of the matrix a row at a time. However, the hogel data present in this matrix after one iteration through the process is typically incomplete. For example, row one of matrix 520 includes the first 35 hogel pixel values for each sixth of the entire image set. The preceding examples illustrated in the figures are schematic in nature, and typical implementations use greater volumes of data. Moreover, in many situations it is computationally beneficial to utilize data sets where the number of data values is some power of two.

Figure 6:
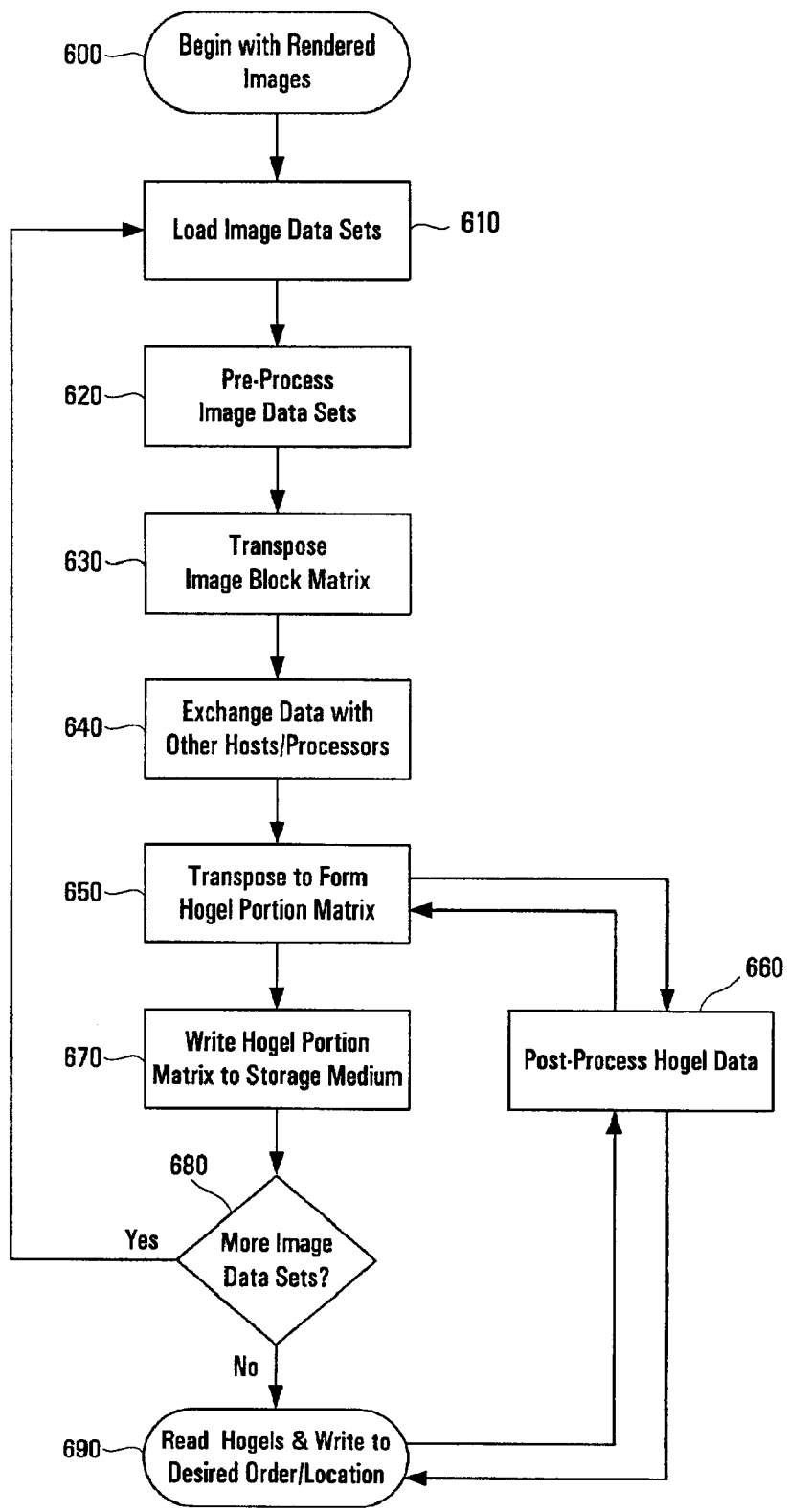
FIG. 6 is a flow chart illustrating techniques of the present invention.

FIG. 6 is a flow chart illustrating the reparameterization process. FIG. 6 also shows several additional steps that can be taken to provide further image processing and to put the hogel images in the most convenient form for use by a hologram printer.

The process begins at 600 where rendered images are created and stored. The images can be stored in one storage medium common to all hosts, or portions of the images can be stored on respective hosts. In general, images should be stored in a location and organized in a manner so as to reduce the amount of time required to read in the images. Image data sets are loaded into the host's memory in 610. Typically, only a portion of the total amount of image data to be processed by any particular host can be stored in the host's memory at any one time. The image data sets are then optionally pre-processed in 620. Pre-processing includes image processing operations that may or may not-be separate from image data reparameterization. For example, if the image data represents 90,000 hogels (300 by 300 hogels) but it is only desired to prepare a smaller portion of hologram printing (e.g., 100 by 100 hogels), then the image data can be appropriately down-sampled at this time. Similarly, image data statistics can be compiled as data is loaded, or once the data resides in memory and is available for analysis. Interpolation between images is another example of a pre-processing technique. Such techniques use optical or vector flow analysis on a sequence of images to determine the location of pixels in the interpolated images. Additional examples of pre-processing include image enhancement (e.g., brightness, contrast, etc.), color correction, compositing, watermarking, embedding hidden or limited-viewability information. Other examples of pre-processing will be well known to those having ordinary skill in the art.

Next, the image block matrix is transposed (630) as illustrated in FIGS. 3A and 3B. Image data is exchanged (640) among the various host and/or processors being utilized. Methods described in conjunction with FIG. 4 are among the most preferred, but those having ordinary skill in the art will readily recognize a variety of techniques that can be used to share information among the hosts/processors. In 650, the image data received from the various other hosts (and retained by the relevant host) are transposed again to form a hogel portion matrix. At this point, the data in the hogel portion matrix can optionally be subjected to post-processing shown in 660.

Like pre-processing 620, post-processing 660 includes image processing operations that may or may not be separate from image data reparameterization. However, an image data processing operation is typically characterized as a post-processing operation when it is more advantageously performed on data resulting from the reparameterization steps. Moreover, given that the hogel portion matrix resulting from the transpose operation of 650 may not have complete hogel information, post-processing is often deferred to a later stage of the process (as shown in conjunction with step 690) where complete hogels have been assembled.

One example of a post-processing step is view zone correction. Holographic stereograms can be constructed with view zones that act like a small two-dimensional windows located in three-dimensional space through which the observer of a holographic stereogram can see a hologram. As with a small window or keyhole, if the observer is looking completely within the single view zone, the observer will see the whole image. If the observer is at a distance from the view zone, the observer will only see the partial image that passes through the view zone at that distance. The observer will see no image when the eye's position relative to the view zone allows none of the diffracted rays of light to enter the eye, for example at eye positions in the same plane as the view zone but not within it. When the observer's eye moves within the two-dimensional view zone, a degree of parallax may be discernable depending on the scale of the view zone relative to the eye's pupil diameter (approximately 3 mm). Additionally, holographic stereograms can have multiple, independent view zones. By post-processing the already reparameterized data, one can simulate the presence of a view zone at some location other than infinity. In the simplest case, this can be accomplished by translating hogel images either horizontally or vertically. In such cases, image pixels that might normally have been used when the hogel is displayed on an SLM for printing, would now be discarded. Newly occurring blank spaces in the hogel would then be filled in with, for example, black pixels.

Another example of a post-processing step is view angle correction. In general, the hologram printing equipment imposing view angle restrictions on recorded holograms. In cases where the hogel data corresponds to a view angle that is significantly different from that of the hologram printer, the hogel image can be scaled accordingly. Corrections for optical system distortion (e.g., pin-cushion or barrel effects) can also be made during post-processing steps. Other examples of post-processing operations include filtering, image and color processing, gathering color distribution information, pattern matching, hogel image rotation, compositing, cropping, and directional interpolation (e.g., increasing the directional resolution of the hogel). Other examples of post-processing will be well known to those having ordinary skill in the art.

The hogel portion matrix is typically written to a storage medium (670) so that the host's memory can be cleared for subsequent iterations of the process. Decision box 680 illustrates the determination whether additional image data sets are to be reparameterized, and if so operation proceeds to step 610 where the process is repeated accordingly. If not, the process terminates, or proceeds to 690 where the hogels are loaded into memory and then re-written in a predetermined order more suitable for storing and or printing. During this re-writing step, post-processing 660 can also occur. Alternately, the hogels can be sent directly to a hologram printer (not shown).

Those having ordinary skill in the art will readily recognize that certain steps illustrated in FIG. 6 can be eliminated or taken in an alternate order. Moreover, the method described in FIG. 6 is typically implemented as one or more software programs for a computer system, that is encoded in a computer readable medium as instructions executable on one or more processors. The computer readable medium can be any one of an electronic storage medium, a magnetic storage medium, an optical storage medium, and a communications medium conveying signals encoding the instructions. Separate instances of these programs can be executed on separate computer systems in keeping with the multi-process methods described above.

Figure 7:
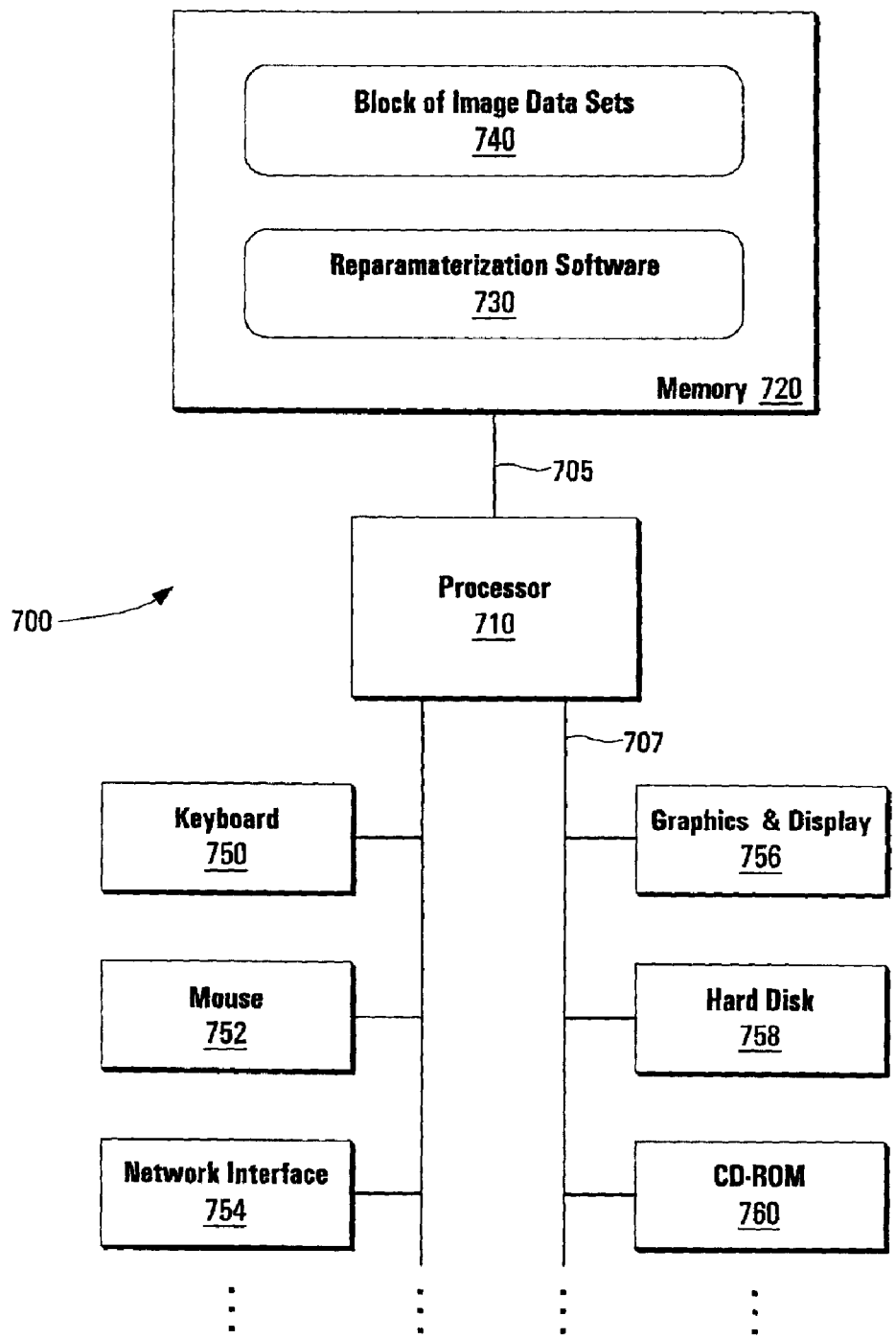
FIG. 7 is a block diagram of a computer system for implementing the techniques of the present invention.

FIG. 7 illustrates a block diagram of a computer system 700 for implementing the image processing techniques of the present invention. Computer system 700 includes a processor 710 and a memory 720 coupled together by communications bus 705. Processor 710 can be a single processor or a number of individual processors working together. Memory 720 is typically random access memory (RAM), or some other dynamic storage device, and is capable of storing instructions to be executed by the processor, e.g., reparameterization software 730, and information used by the instructions, such as image data sets 740.

Memory 720 is also used for storing temporary variables or other intermediate information during the execution of instructions by the processor 710.

Reparameterization software 730 is one example of a software image processing tool, and in the present example, it is illustrative of a reparameterization method implemented in software. Those having ordinary skill in the art will readily recognize that the techniques and methods discussed below can be implemented in software using a variety of computer languages, including, for example, traditional computer languages such as assembly language, Pascal, and C; object oriented languages such as C++ and Java; and scripting languages such as Perl and Tcl/Tk. Image data sets 740 are one example of information that can be used by software such as reparameterization software 730 as part of the image processing process used in creating holographic stereograms. Additionally, software 730 can be provided to the computer system via a variety of computer readable media including electronic media (e.g., flash memory), magnetic storage media (e.g., hard disk 758, a floppy disk, etc.), optical storage media (e.g., CD-ROM 760), and communications media conveying signals encoding the instructions (e.g., via a network coupled to network interface 754).

Computer system 700 also includes devices such as keyboard 750, mouse 752, network interface 754, graphics & display 756, hard disk 758, and CD-ROM 760, all of which are coupled to processor 710 by communications bus 707. It will be apparent to those having ordinary skill in the art that computer system 700 can also include numerous elements not shown in the figure, such as additional storage devices, communications devices, input devices, and output devices, as illustrated by the ellipsis shown.

Figure 8:
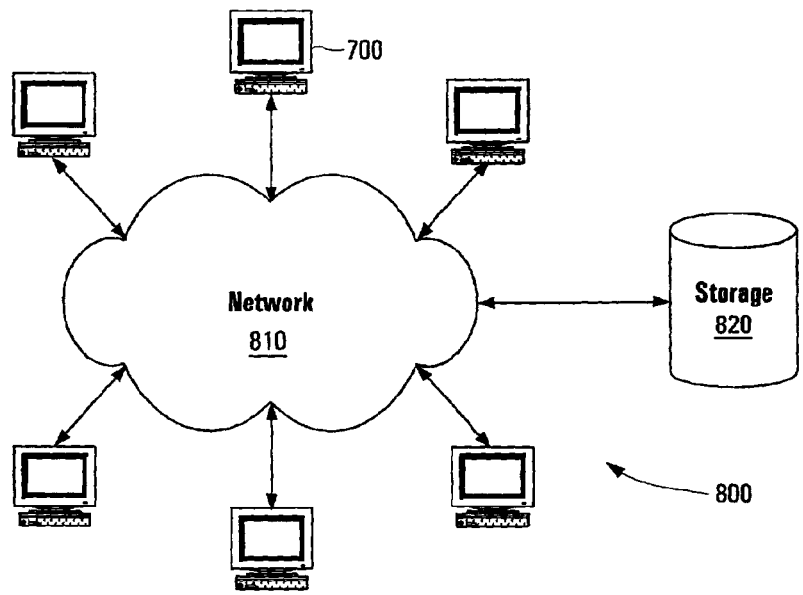
FIG. 8 is a block diagram of a cluster of computer systems for implementing the tools and techniques of the present invention.

FIG. 8 is a block diagram of a cluster 800 of computer systems for implementing the tools and techniques of the present invention. Each of the computer systems or hosts in the cluster is typically like computer system 700 of FIG. 7. The hosts of cluster 800 communicate with each other, and optional storage 820 via network 810. Many different hardware and software schemes for communication via network 810 (e.g., Ethernet, Fibre Channel, Infiniband, etc.) are well known to those shaving ordinary skill in the art. Additionally, each of the hosts in cluster 800 need not have all of the elements present in computer system 700. For example, many cluster configuration would not require that all of the hosts have keyboard 750, mouse 752, graphics and display 756, or CD-ROM 760.

Figure 9:
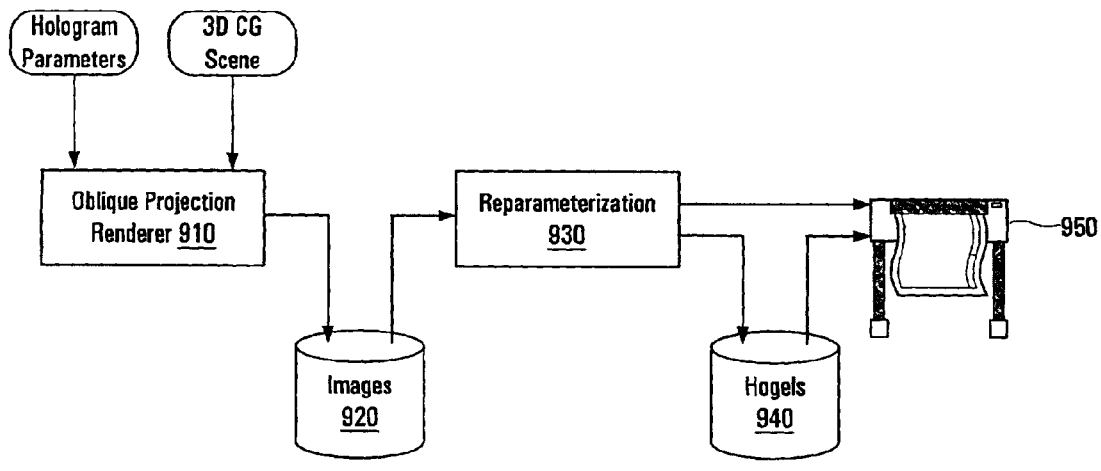
FIG. 9 illustrates a hologram production system.

FIG. 9 illustrates hologram production system 900. In contrast to so-called "on-line" production systems (where the hogel images to be recorded in the holographic recording material are rendered, used, and discarded as the hologram is being printed) hologram production system 900 is often referred to as an "off-line" production system. This is because the images are first rendered by renderer 910 based on hologram parameter information (e.g., hologram size, hogel size, resolution, field of view, and position of a hologram illuminating light source) and 3D computer graphics scene information, stored, and then printed.

Figure 1:
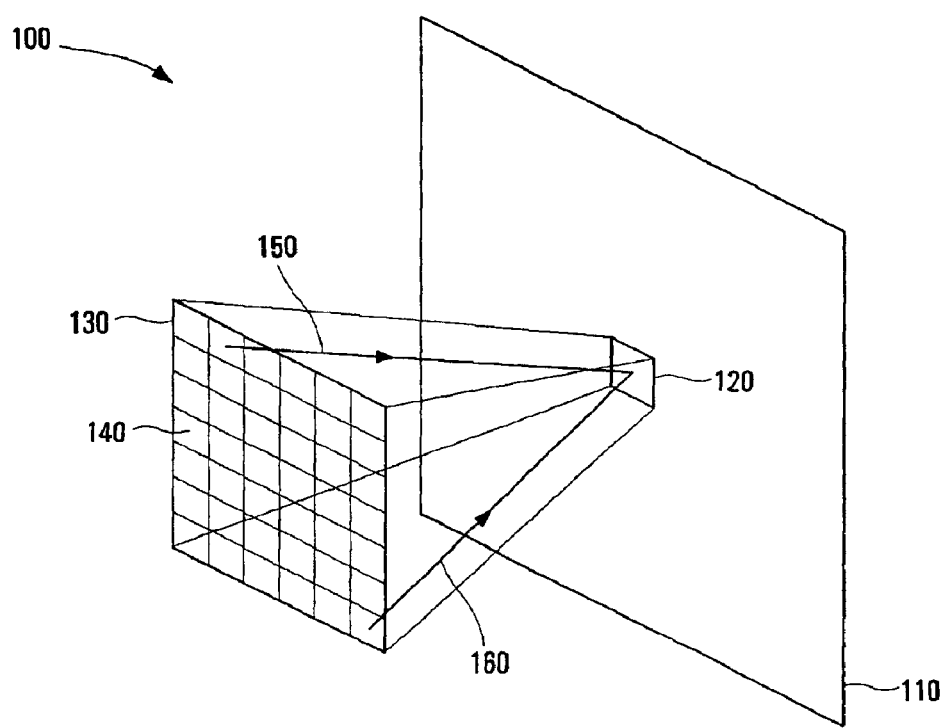
FIG. 1 alternately illustrates the relationship between a hogel and the computer graphics image used to create the hogel, and the relationship among certain parts of a system for producing holograms.

The 3D computer graphics scene is based on a 3D computer graphics model first composed using standard 3D graphics tools (e.g. a 3D modeling tool such as Discreet's 3D Studio Max, or Maya from Alias|Wavefront, a division of Silicon Graphics Limited) and techniques. Additional software is then typically used to manipulate the model and support the definition and adjustment of multiple hologram parameters. In the renderer 910, light field images are generated using parallel oblique projections, one per discrete direction printed by the hologram printer. This is in contrast to on-line schemes using other light-field models where the image for an entire hogel (i.e. using all discrete direction printed by the hologram printer) is rendered at one time. Rendering all of the projections in one discrete direction for all of the hogels in, for example, a tile of hogels, efficiently makes use of the DPP parameterization. As noted above in the context of FIG. 1, the projection plane and the rendering window typically match the hologram's geometry.

In general, any computer graphics rendering technique can be used in conjunction with the DPP representation as described herein. Thus, renderer 910 can be implemented using scan-conversion or scan-line conversion (e.g., as implemented in the OpenGL™ graphics library), ray tracing techniques, and even image-based rendering techniques. Moreover, rendering hardware and/or software may become sufficiently fast and storage-dense in the future so as to obviate the need for separate storage 920 and/or storage 940.

The rendered light-field images are saved in storage 920, which can be any type of suitable data storage device, including magnetic, electronic, and optical storage devices. A light-field like structure using a DPP-like representation is used to store the data, where the directional samples are given by the geometry of the hologram in the printer, i.e., the projection plane and the rendering window match the hologram's geometry. The process is repeated for each discrete direction printed by the hologram printer.

Next the images are reparameterized (930) as described above and processed into hogel images which are either stored (940) or sent directly to hologram printer 950. In general, a hologram is printed by recording interference patterns in a light sensitive holographic recording material. A simple method exposes the material with coherent laser light generated by a red, a green and a blue laser. The laser beams are combined into two sets, the object beam(s) and the reference beam(s), both containing all three color components. The object beams are then modulated in amplitude using a spatial light modulator, typically an LCD screen or a digital micromirror array, using the rendered images. The modulated object beam is then combined with the reference beam in the recording material to record a single hogel's interference pattern.

As previously noted, the ability to perform reparameterization of data associated with holographic stereograms is effected by computer hardware and software limitations. For example, the most cost-effective computer systems for use in reparameterization (e.g., x86 architecture based PCs) utilize 32-bit computing architectures. This limits the amount of addressable memory to $2^{32}$ bytes, or 4 GB, and poses other limitations as well. As affordable 64-bit computing platforms become available, additional reparameterization techniques become possible.

Returning to FIG. 2A, image matrix 200 is a matrix including all of the image data rendered for a particular holographic stereogram tile. Instead of transposing matrix 200 as shown in FIG. 2B, hogel data can be read directly from image matrix 200 stored in memory and sent either to a storage medium (e.g., producing hogel files on a hard disk drive) or to a hologram production device.

Figure 10:
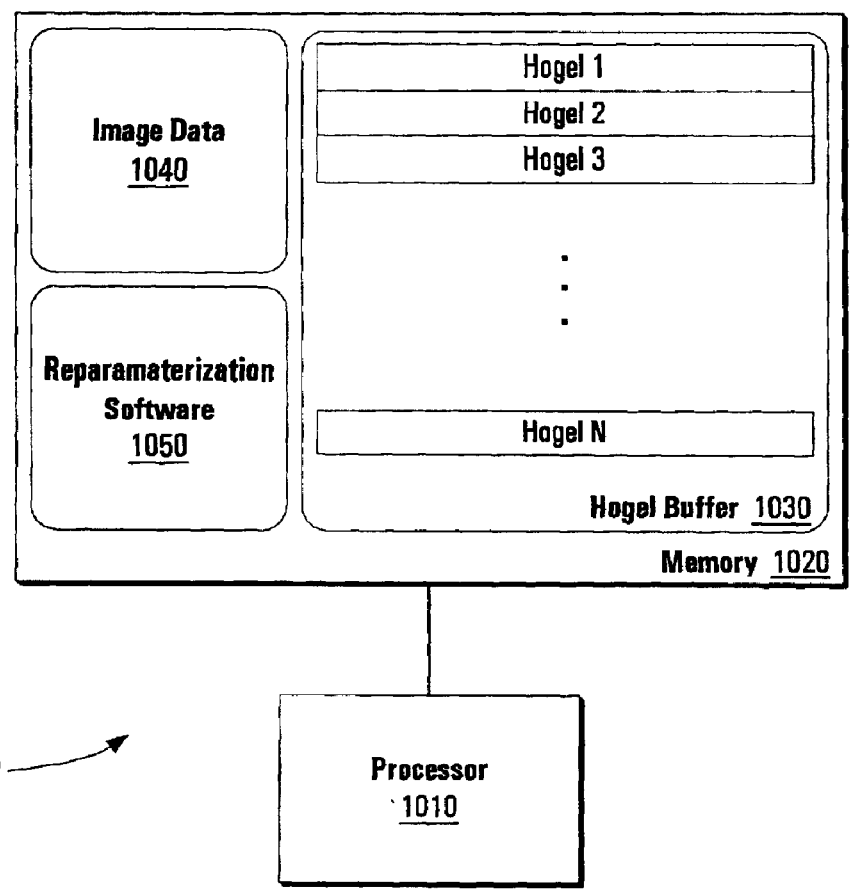
FIG. 10 is a block diagram of a computer system for implementing techniques of the present invention.

FIG. 10 illustrates yet another approach to performing reparameterization using a simplified computer system 1000. Computer system 1000 includes one or more processors 1010, memory 1020, and additional computer system related devices (not shown) such as those illustrated in and described with respect to FIG. 7. Not including any memory required for system software, other application programs, system operation overhead (which are not shown), memory 1020 is generally divided into three portions: hogel buffer 1030, image data 1040, and reparameterization software 1050. In this example, reparameterization software 1050 loads one complete image (e.g., one complete parallel oblique projection) or a portion thereof into image data 1040. Often such images are stored on a nonvolatile storage medium in a compressed format (e.g., TIFF or JPEG), so loading image data can also require decompression of the image data. Such decompression may require the addition of a decompression scratch-buffer within memory 1020.

Once image data 1040 is in memory, reparameterization software 1050 copies pixel data (typically three bytes per pixel) from image data 1040 to the appropriate hogel (e.g., hogel 1 through hogel N). The number of complete hogels that can be stored in memory 1020 is generally limited by the amount of memory available for hogel buffer 1030. Typically, this means that only a subset of all hogels needed for a tile can be stored in memory at one time. Accordingly, it may not be necessary for reparameterization software 1050 to load the entire image to be processed (e.g., only 25% of the image is needed because only 25% of the total number of hogels can be retained in memory). Similarly, it may not be necessary for reparameterization software 1050 to process an entire image that is stored in memory.

After all of the relevant data has been extracted from image data 1040, reparameterization software 1050 will load the next image (or image portion) and repeat the process for the hogels currently in hogel buffer 1030. Repeating this process of each of the images used to construct a holographic stereogram yields a set of complete hogels that can then be saved to a storage medium or sent directly to a hologram production device. The entire process can then be repeated for the next set of hogels that can fit into memory.

The system illustrated in FIG. 10 lends itself to multi-threaded/multiprocessor implementations. For example, system 1000 can include several processors each of which uses a hogel buffer and image data for a portion of the overall holographic stereogram. Such a system might be a multi-processor PC, where each CPU on the PC runs a reparameterization thread and all of the CPUs share a common pool of memory.

In addition to the ability to perform reparameterization on less-expensive computer systems, these techniques make it easier to perform reparameterization without having all of the image data available. For example, rendering of the image data can be performed simultaneously with the reparameterization or in some interleaved fashion. Also, these reparameterization techniques are less sensitive to variations in the total number of images, the size of the images and resulting hogels, and the resolution of images and resulting hogels. In general, the source images can have different resolutions in a single data set. Thus, images that are sampled at extreme directions can be reduced in image size. Also, images from multiple sources can be merged together into one data set.

Another technique that can provide further reparameterization efficiency is the use of sector-aligned memory. For example, if the memory used for the hogel buffer is allocated (e.g., using a VirtualAlloc memory management function) in a manner that is aligned with the sector size of the hard drive up on which the complete hogels will stored (e.g., hard drive sector sized pages in memory), then the write-to-disk operations are more efficient because they can bypass caching mechanisms in the operating system. Similar efficiencies can be gained through sector-aligned read operations as well.

It should be noted that although the systems and techniques disclosed in this application emphasize their applicability to the production of fill parallax holographic stereograms, those having ordinary skill in the art recognize that there are differing degrees to which a hologram might display different views of a 3D scene in the in vertical dimension. Thus, full-parallax holographic stereograms generally include any holographic stereogram that displays some image variation in the vertical dimension. Additionally, the systems and techniques disclosed in this application can be applied to the production of HPO holographic stereograms.

Although the present invention has been described with respect to a specific preferred embodiment thereof, various changes and modifications may be suggested to one skilled in the art and it is intended that the present invention encompass such changes and modifications fall within the scope of the appended claims.

What is claimed is:

1. A computer implemented method of processing image data for use in holographic stereograms:

providing a plurality of image data sets;

loading at least one of the plurality of image data sets into a memory, wherein the at least one of the plurality of image data sets is organized as an image block matrix;

transposing the image block matrix to form a transposed imaged block matrix;

replacing a portion of the transposed image block matrix with a portion of a second transposed image block matrix to form a resulting image block matrix; and transposing the resulting image block matrix to form a hologram element (hogel) portion matrix.

2. The computer-implemented method of claim 1 wherein the providing a plurality of image data sets further comprises:

providing a computer graphics model of a scene;

generating a plurality of sets of light-field data from the computer graphics model of a scene using an isotropic parameterization of a light field, each of the plurality of sets of light-field data corresponding to a respective one of the plurality of image data sets.

3. The computer-implemented method of claim 2 wherein the generating further comprises at least one of one of scan-line conversion, ray tracing, and image-based rendering.

4. The computer-implemented method of claim 2 further comprising:

defining a plurality of sampling directions; and wherein the generating a plurality of sets of light-field data further comprises generating a plurality of parallel oblique projections using at least one of the plurality of sampling directions.

5. The computer-implemented method of claim 2 wherein the isotropic parameterization of a light field is a direction-and-point parameterization of a light field.

6. The computer-implemented method of claim 1 wherein the providing a plurality of image data sets further comprises:

providing a computer graphics model of a scene;

rendering a plurality of oblique projections of the computer graphics model of a scene using at least one of scan-line conversion, ray tracing, and image-based rendering, each of the plurality of oblique projections corresponding to a respective one of the plurality of image data sets.

7. The computer-implemented method of claim 1 wherein each of the plurality of image data sets corresponds to an oblique projection of a computer graphics model of a scene.

8. The computer-implemented method of claim 1 wherein each of the plurality of image data sets includes a plurality of pixel values, each of the plurality of pixel values corresponding to a respective hogel to be printed in a hologram tile.

9. The computer-implemented method of claim 1 wherein each of the plurality of image data sets includes at least one of horizontal parallax only (HPO) data and full parallax data.

10. The computer-implemented method of claim 1 wherein the image block matrix includes a plurality of rows, each of the plurality of rows corresponding to a respective one of the plurality of image data sets.

11. The computer-implemented method of claim 1 wherein the second transposed image block matrix is formed by:
providing a second plurality of image data sets;
loading at least one of the second plurality of image data sets into a second memory, wherein the at least one of the second plurality of image data sets is organized as a second image block matrix; and
transposing the second image block matrix to form the second transposed imaged block matrix.

12. The computer-implemented method of claim 1 wherein:
the loading at least one of the plurality of image data sets into a memory, and the transposing the image block matrix are performed in a first computer system; and
the loading at least one of the second plurality of image data sets into a second memory, and the transposing the second image block matrix are performed in a second computer system coupled to the first computer system.

13. The computer-implemented method of claim 1 wherein:
the loading at least one of the plurality of image data sets into a memory, and the transposing the image block matrix are performed in a first processor of a computer system; and
the loading at least one of the second plurality of image data sets into a second memory, and the transposing the second image block matrix are performed in a second processor of the computer system.

14. The computer-implemented method of claim 11 wherein:
the loading at least one of the plurality of image data sets into a memory, and the transposing the image block matrix are performed by a first process in a processor of a computer system; and
the loading at least one of the second plurality of image data sets into a second memory, and the transposing the second image block matrix are performed by a second process in the processor of the computer system.

15. The computer-implemented method of claim 11 further comprising:
replacing a second portion of the second transposed image block matrix with a second portion of the transposed image block matrix to form a second resulting image block matrix.

16. The computer-implemented method of claim 1 wherein the replacing a portion of the transposed image block matrix with a portion of a second transposed image block matrix is performed by a multi-process two-dimensional matrix transpose operation.

17. The computer-implemented method of claim 16 wherein the multi-process two-dimensional matrix transpose operation is one of an AllToAll operation, an AllToAll operation, and an AllToAll operation, as defined by the Message Passing Interface 2 (MPI-2) standard.

18. The computer-implemented method of claim 1 further comprising:
storing the hogel portion matrix in at least one file on a storage medium, the storage medium being one of a magnetic storage medium, an electronic storage medium, and an optical storage medium.

19. The computer-implemented method of claim 18 further comprising:
reading data from the hogel portion matrix stored in the at least on file; and
writing, in a predetermined order, at least one hogel to one of the storage medium, a second storage medium, and a hologram printer.

20. The computer-implemented method of claim 19 further comprising adjusting a view angle associated with the at least one hogel.

21. The computer-implemented method of claim 20 wherein the adjusting further comprises scaling the at least one hogel by one of adding data and removing data.

22. The computer-implemented method of claim 19 further comprising adjusting a view zone associated with the at least one hogel.

23. The computer-implemented method of claim 22 wherein the adjusting further comprises translating at least one pixel of the at least one hogel.

24. The computer-implemented method of claim 19 further comprising:
performing at least one of an anti-aliasing operation, a rotation operation, a directional interpolation operation, a compression operation and a compositing operation on the at least one hogel.

25. The computer-implemented method of claim 1 further comprising repeating the loading at least one of the plurality of image data sets into a memory, the transposing the image block matrix to form a transposed imaged block matrix, the replacing a portion of the transposed image block matrix with a portion of a second transposed image block matrix to form a resulting image block matrix, and the transposing the resulting image block matrix to form a hogel portion matrix.

26. The computer-implemented method of claim 1 encoded in a computer readable medium as instructions executable on a processor, the computer readable medium being one of an electronic storage medium, a magnetic storage medium, an optical storage medium, and a communications medium conveying signals encoding the instructions.

27. The computer-implemented method of claim 1 further comprising:
collecting image data statistics by analyzing at least one of:
the at least one of the plurality of image data sets;
the image block matrix;
the transposed image block matrix;
the resulting image block matrix; and
the hogel portion matrix.

28. The computer-implemented method of claim 27 wherein the image data statistics include at least one of average image intensity and average hogel intensity.

29. The computer-implemented method of claim 1 further comprising adjusting a view angle associated with the hogel portion matrix.

30. The computer-implemented method of claim 29 wherein the adjusting further comprises scaling the hogel portion matrix by one of adding data and removing data.

31. The computer-implemented method of claim 1 further comprising adjusting a view zone associated with the hogel portion matrix.

32. The computer-implemented method of claim 31 wherein the adjusting further comprises translating at least one pixel of the hogel portion matrix.

33. The computer-implemented method of claim 1 further comprising:
performing at least one of an anti-aliasing operation, a rotation operation, a directional interpolation operation, a compression operation, and a compositing operation on the hogel portion matrix.

34. The computer-implemented method of claim 1 further comprising:
downsampling data in the image block matrix to thereby reduce an amount of data present in the image block matrix.

35. An apparatus comprising:
a processor;
a storage medium coupled to the processor and including a plurality of image data sets;
a memory coupled to the processor; and a computer program for processing image data for use in holographic stereograms, the program being at least partially storable in the memory, and executable on the processor, the program including:
an image data loading routine for loading at least one of the plurality of image data sets into the memory, wherein the at least one of the plurality of image data sets is organized as an image block matrix;
a first transposing routine for transposing the image block matrix to form a transposed imaged block matrix;
a data replacement routine for replacing a portion of the transposed image block matrix with a portion of a second transposed image block matrix to form a resulting image block matrix; and
a second transposing routine for transposing the resulting image block matrix to form a hologram element (hogel) portion matrix.

36. The apparatus of claim 35 wherein the plurality of image data sets on the storage medium are formed by generating a plurality of sets of light-field data from a computer graphics model of a scene using an isotropic parameterization of a light field, each of the plurality of sets of light-field data corresponding to a respective one of the plurality of image data sets.

37. The apparatus of claim 35 wherein the plurality of image data sets on the storage medium are formed by rendering a plurality of oblique projections of a computer graphics model of a scene using at least one of scan-fine conversion, ray tracing, and image-based rendering, each of the plurality of oblique projections corresponding to a respective one of the plurality of image data sets.

38. The apparatus of claim 35 wherein each of the plurality of image data sets 2 on the storage medium corresponds to an oblique projection of a computer graphics model of a scene.

39. The apparatus of claim 35 wherein each of the plurality of im age data sets includes a plurality of pixel values, each of the plurality of pixel values corresponding to a respective hogel to be printed in a hologram tile.

40. The apparatus of claim 35 wherein the image block matrix includes a plurality of rows, each of the plurality of rows corresponding to a respective one of the plurality of image data sets.

41. The apparatus of 35 further comprising:
a second processor;
a second storage medium coupled to the processor and including a second plurality of image data sets;
a second memory coupled to the second processor; and
a second computer program for processing image data for use in holographic stereograms, the second program being at least partially storable in the second memory, and executable on the second processor, the second computer program including:
an image data loading routine or loading at least one of the second plurality of image data sets into the second memory, wherein the at least one of the second plurality of image data sets is organized as a second image block matrix;
a first transposing routine for transposing the second image block matrix to form the second transposed imaged block matrix;
a data replacement routine for replacing a second portion of the second transposed image block matrix with a second portion of the transposed image block matrix to form a second resulting image block matrix; and
a second transposing routine for transposing the second resulting image block matrix to form a second hologram element (hogel) portion matrix.

42. The apparatus of claim 41 wherein:
the processor, storage medium, and memory comprise a first computer system; and
the second processor, second storage medium, and second memory comprise a second computer system, the first computer system being coupled to the second computer system.

43. The apparatus of claim 42 further comprising:
a first network interface coupled to the processor;
a second network interface coupled to the second processor, wherein the first network interface is coupled to the second network interface via a network.

44. The apparatus of claim 41 wherein:
the processor, second processor, storage medium, second storage medium, memory, and second memory comprise a computer system.

45. Me apparatus of claim 44 wherein the storage medium includes the second storage medium.

46. The apparatus of claim 44 wherein the memory includes the second memory.

47. The apparatus of claim 35 wherein the data replacement routine comprises a multi-process two-dimensional matrix transpose operation.

48. The apparatus of claim 35 wherein th multi-process two-dimensional matrix transpose operation is one of an AllToAll operation, an AllToAll operation, end an AllToAll operation, as defined by the Message Passing Interface 2 (MPI-2) standard.

49. The apparatus of claim 35 wherein the computer program further comprises:
a storing routine for storing the hogel portion max in at least one file on the storage medium, the storage medium being one of a magnetic storage medium, au electronic storage medium, and an optical storage medium.

50. A computer implemented method of processing image data for use in holographic stereograms:

provide a plurality of image data sets;

loading at least a portion of one of the plurality of image data sets into a memory, the at least a portion of one of the plurality of image data sets including a plurality of pixel values;

copying a first one of he plurality of pixel values from the at least a portion of one of the plurality of image data sets to a first hogel portion in a hogel buffer in the memory;

copying a second one of the plurality of pixel values from the at least a portion of one of the plurality of image data sets to a second hogel portion in the hogel buffer in the memory.

51. The computer-implemented method of claim 50 wherein the providing a plurality of image data sets further comprises:

providing a computer graphics model of a scene;

generating a plurality of sets of light-field data from the computer graphics model of a scene using an isotropic parameterization of a light field, each of the plurality of sets of light-field data corresponding to a respective one of the plurality of image data sets.

52. The computer-implemented method of claim 51 wherein the generating further comprises at least one of one of scan-line conversion, ray tracing, and image-based rendering.

53. The computer-implemented method of claim 51 further comprising:

defining a plurality of sampling directions; and wherein the generating a plurality of sets of light-field data further comprises generating a plurality of parallel oblique projections using at least one of the plurality of sampling directions.

54. The computer-implemented method of claim 51 wherein the isotropic parameterization of a light field is a direction-and-point parameterization of a light field.

55. The computer-implemented method of claim 50 wherein the providing a plurality of image data sets further comprises:

providing a computer graphics model of a scene;

rendering a plurality of oblique projections of the computer graphics model of a scene using at least one of scan-line conversion, ray tracing, and image-based rendering, each of the plurality of oblique projections corresponding to a respective one of the plurality of image data sets.

56. The computer-implemented method of claim 50 wherein each of the plurality of image data sets corresponds to an oblique projection of a computer graphics model of a scene.

57. The computer-implemented method of claim 50 wherein each of the plurality of pixel values corresponds to a respective hogel to be printed in a hologram tile.

58. The computer-implemented method of claim 50 further comprising: repeating the copying steps for successive ones of the plurality of pixel values.

59. The computer-implemented method of claim 50 further comprising: storing the first hogel portion to a storage medium.

60. The computer-implemented method of claim 50 wherein the memory is at least partially aligned to sectors of a storage medium.

61. The computer-implemented method of claim 50 further comprising:

pre-processing the at least a portion of one of the plurality of image data sets subsequent to loading the at least a portion of one of the plurality of image data sets.

62. The computer-implemented method of claim 50 further comprising:

post-processing the first hogel portion subsequent to the copying of the first one of the plurality of pixel values.

63. The computer-implemented method of claim 50 encoded in a computer readable medium as instructions executable on a processor, the computer readable medium being one of an electronic storage medium, a magnetic storage medium, an optical storage medium, and a communications medium conveying signals encoding the instructions.

* * * * *

UNITED STATES PATENT AND TRADEMARK OFFICE
CERTIFICATE OF CORRECTION

PATENT NO. : 6,868,177 B1
DATED : March 15, 2005
INVENTOR(S) : Camahort et al.

It is certified that error appears in the above-identified patent and that said Letters Patent is hereby corrected as shown below:

Column 15,
Lines 16 and 26, please delete "claim 1" and insert "claim 11"

Column 17,
Line 53, after "of", please delete "scan-fine" and insert -- scan-line --
Line 58, after "sets", please delete "2"
Line 62, after "of", please delete "im age" and insert -- image --

Column 18,
Line 13, after "routine", please delete "or" and insert -- for --
Line 44, before "apparatus", please delete "Me" and insert -- The --
Line 53, please replace with the following:
-- AllToAll operation, an AllToAllV operation, and an AllToAllW --
Line 58, after "portion" please delete "max" and insert -- matrix --
Line 60, after "medium" please delete "au" and insert -- an --

Column 19,
Line 8, after "of" please delete "he" and insert -- the --

Signed and Sealed this

Ninth Day of August, 2005

JON W. DUDAS
*Director of the United States Patent and Trademark Office*